(12) United States Patent
Oran et al.

(10) Patent No.: US 6,240,084 B1
(45) Date of Patent: May 29, 2001

(54) TELEPHONY-ENABLED NETWORK PROCESSING DEVICE WITH SEPARATE TDM BUS AND HOST SYSTEM BACKPLANE BUS

(75) Inventors: David R. Oran, Acton, MA (US); Cary W. FitzGerald, Pleasanton; Michael E. Knappe, San Jose, both of CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 08/729,245

(22) Filed: Oct. 10, 1996

(51) Int. Cl.[7] .................................................. H04L 12/66
(52) U.S. Cl. .................... 370/352; 370/401; 370/463; 370/476
(58) Field of Search ..................................... 370/352, 354, 370/356, 401, 419, 420, 463, 474, 476; 709/238, 243, 245

(56) References Cited

U.S. PATENT DOCUMENTS

| | | |
|---|---|---|
| 4,523,055 | 6/1985 | Hohl et al. . |
| 4,535,448 | 8/1985 | Baxter et al. . |
| 4,644,532 | 2/1987 | George et al. . |
| 4,740,955 | 4/1988 | Litterer et al. . |
| 4,771,425 | 9/1988 | Baran et al. . |
| 4,811,339 | 3/1989 | Bouillot et al. . |
| 4,819,228 | 4/1989 | Baran et al. . |
| 4,879,551 | 11/1989 | Georgiou et al. . |
| 4,903,261 | 2/1990 | Baran et al. . |
| 4,962,532 | 10/1990 | Kasiraj et al. . |
| 4,970,678 | 11/1990 | Sladowski et al. . |
| 4,991,169 | 2/1991 | Davis et al. . |
| 5,020,058 | 5/1991 | Holden et al. . |
| 5,059,925 | 10/1991 | Weisbloom . |
| 5,072,449 | 12/1991 | Enns et al. . |
| 5,088,032 | 2/1992 | Bosack . |
| 5,115,431 | 5/1992 | Williams et al. . |
| 5,121,390 | 6/1992 | Farrell et al. . |
| 5,128,945 | 7/1992 | Enns et al. . |
| 5,224,099 | 6/1993 | Corbalis et al. . |
| 5,243,342 | 9/1993 | Kattemalalavadi et al. . |

(List continued on next page.)

Primary Examiner—Ajit Patel
Assistant Examiner—Bob A. Phunkulh
(74) Attorney, Agent, or Firm—Marger Johnson & McCollom, PC

(57) ABSTRACT

A PC-based server platform includes a first backplane bus used for transferring data and commands to various PC peripheral devices. A network router and a telephony endpoint card are coupled to the backplane bus and separately coupled through a second Time Division Multiplexed (TDM) bus. The router includes interfaces to various packet switched networks such as a Wide Area Network (WAN) and a Local Area Network (LAN). The TDM bus is used to route telephony data between the different Internet Protocol (IP)-based networks and the telephony card independently of the host system. The PC host processor also uses the router as a standard LAN interface for transferring data packets. A DSP voice processing card is coupled between the backplane bus and the TDM bus to compress and decompress the telephony data transferred on the TDM bus.

14 Claims, 4 Drawing Sheets

U.S. PATENT DOCUMENTS

| | | |
|---|---|---|
| 5,255,291 | 10/1993 | Holden et al. . |
| 5,268,592 | 12/1993 | Bellamy et al. . |
| 5,274,631 | 12/1993 | Bhardwaj . |
| 5,274,635 | 12/1993 | Rahman et al. . |
| 5,274,643 | 12/1993 | Fisk . |
| 5,280,480 | 1/1994 | Pitt et al. . |
| 5,280,500 | 1/1994 | Mazzola et al. . |
| 5,313,454 | 5/1994 | Bustini et al. . |
| 5,317,562 | 5/1994 | Nardin et al. . |
| 5,321,350 * | 6/1994 | Haas ................... 324/76.11 |
| 5,327,421 | 7/1994 | Hiller et al. . |
| 5,345,445 | 9/1994 | Hiller et al. . |
| 5,345,446 | 9/1994 | Hiller et al. . |
| 5,359,592 | 10/1994 | Corbalis et al. . |
| 5,365,524 | 11/1994 | Hiller et al. . |
| 5,386,567 | 1/1995 | Lien et al. . |
| 5,390,175 | 2/1995 | Hiller et al. . |
| 5,394,394 | 2/1995 | Crowther et al. . |
| 5,422,880 | 6/1995 | Heitkamp et al. . |
| 5,430,715 | 7/1995 | Corbalis et al. . |
| 5,473,599 | 12/1995 | Li et al. . |
| 5,473,607 | 12/1995 | Hausman et al. . |
| 5,491,687 | 2/1996 | Christensen et al. . |
| 5,491,804 | 2/1996 | Jeath et al. . |
| 5,509,006 | 4/1996 | Wilford et al. . |
| 5,517,185 | 5/1996 | Acimovic et al. . |
| 5,519,704 | 5/1996 | Farinacci et al. . |
| 5,561,669 | 10/1996 | Lenney et al. . |
| 5,699,413 * | 12/1997 | Sridhar .................. 370/496 |
| 5,742,596 * | 4/1998 | Baratz et al. .......... 370/356 |
| 5,802,546 * | 9/1998 | Chisholm et al. .... 711/100 |
| 5,828,846 * | 10/1998 | Kirby et al. ........... 709/238 |

* cited by examiner

TELEPHONY-ENABLED NETWORK PROCESSING DEVICE WITH SEPARATE TDM BUS AND HOST SYSTEM BACKPLANE BUS

BACKGROUND OF THE INVENTION

This invention relates generally to transferring data packets between a telephony endpoint and a wide or local area network and more particularly to a secondary bus provided in a personal computer (PC) server-based platform for increasing the capacity for processing and transferring voice data.

Referring to FIG. 1, a conventional PC host platform 12 includes a PC host motherboard 22 coupled through a PC backplane such as a PCI or ISA bus 20 to various peripheral cards 24. Commercially available Internet-based packet-voice products are referred to generally as telephony endpoint cards 16. The packet-voice products 16 are used to convert analog voice signals from a telephone line 18 to digital data. A number of existing PC-based voice products are based on either ISA or PCI bus telephony cards which connect to the PC backplane bus 20 and interconnect through a TDM bus such as the Dialogic SC bus.

A router card 14 includes a local area network (LAN) interface and a wide area network (WAN) interface for coupling the PC host 22 to different network systems. The telephony cards 16 currently provide no direct Internet Protocol (IP) packet handling or routing functions, and rely on the PC host 22 for performing all packet processing. After the packet processing of the voice data is completed by the PC host 22, the voice packet data is transferred over a LAN or WAN system through router card 14.

One of the principle problems with PC-based packet handling is timely delivery of delay-sensitive voice traffic. In a PC, the simplest solution is to transfer all of the data from the voice endpoint cards 16 across the ISA or PCI bus 20 to a main processor on the PC host motherboard 22. Significant latencies exist in the voice card/host bus transfer, interrupt service and application scheduling, packet treatment logic (e.g., real-time transport protocol (RTP) packetization), transfer through the host computer stack and host processor/NIC bus transfer.

While manageable in internet phone terminals, latencies do not scale well to servers with tens or hundreds of endpoints. Since the host CPU in motherboard 22 and the PC backplane bus 20 are shared resources, performance is throttled for high-end routing applications.

Accordingly, a need remains for improving performance of telephony data handling in PC-based server platforms.

SUMMARY OF THE INVENTION

A PC-based server platform includes one or more telephony endpoint cards that receive and transmit analog telephony data through a telephone line. A router card in the server platform is coupled to different network systems such as an IP-based Wide Area Network (WAN) and a Local Area Network (LAN). The router card and the telephone endpoint card are coupled together with a TDM bus that operates independently from a PC backplane bus normally used for processing and transferring telephony data to various network systems.

The TDM bus transfers telephony data between different network systems and the telephony endpoint cards independently of the host system and the host system backplane bus. The network endpoint is moved onto the same bus as the telephony endpoint cards, eliminating high-volume voice data transfers across a conventional shared PC backplane, such as an ISA or PCI bus.

By eliminating involvement of the PC host in voice packet handling, many of the latencies in current PC server based telephony network communication are eliminated or reduced. The system also has greater configuration flexibility, performance, and scalability than either a combined router/telephony endpoint or a server-based routing design. The router is also used as a standard LAN interface when transferring data packets between a LAN system and the PC host system.

A DSP voice processing card is coupled between the backplane bus and the TDM bus. The DSP compresses and decompresses data transferred between the network systems and the telephony cards. The DSP increases the capacity of the telephony endpoint cards for processing telephony data.

The foregoing and other objects, features and advantages of the invention will become more readily apparent from the following detailed description of a preferred embodiment of the invention which proceeds with reference to the accompanying drawings.

DETAILED DESCRIPTION

Figure 1:
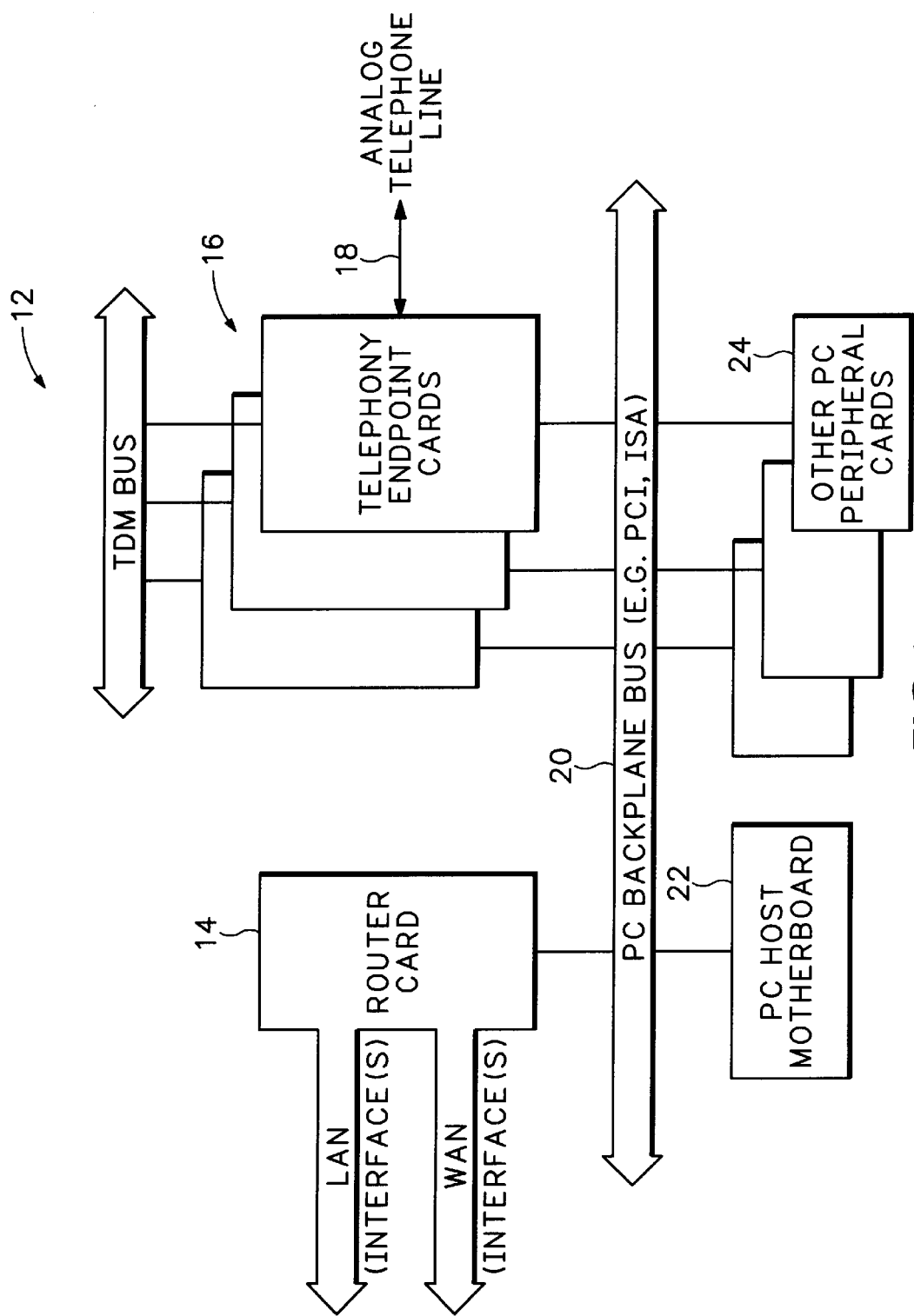
FIG. 1 is a prior art circuit diagram of a PC-based server platform.
Figure 2:
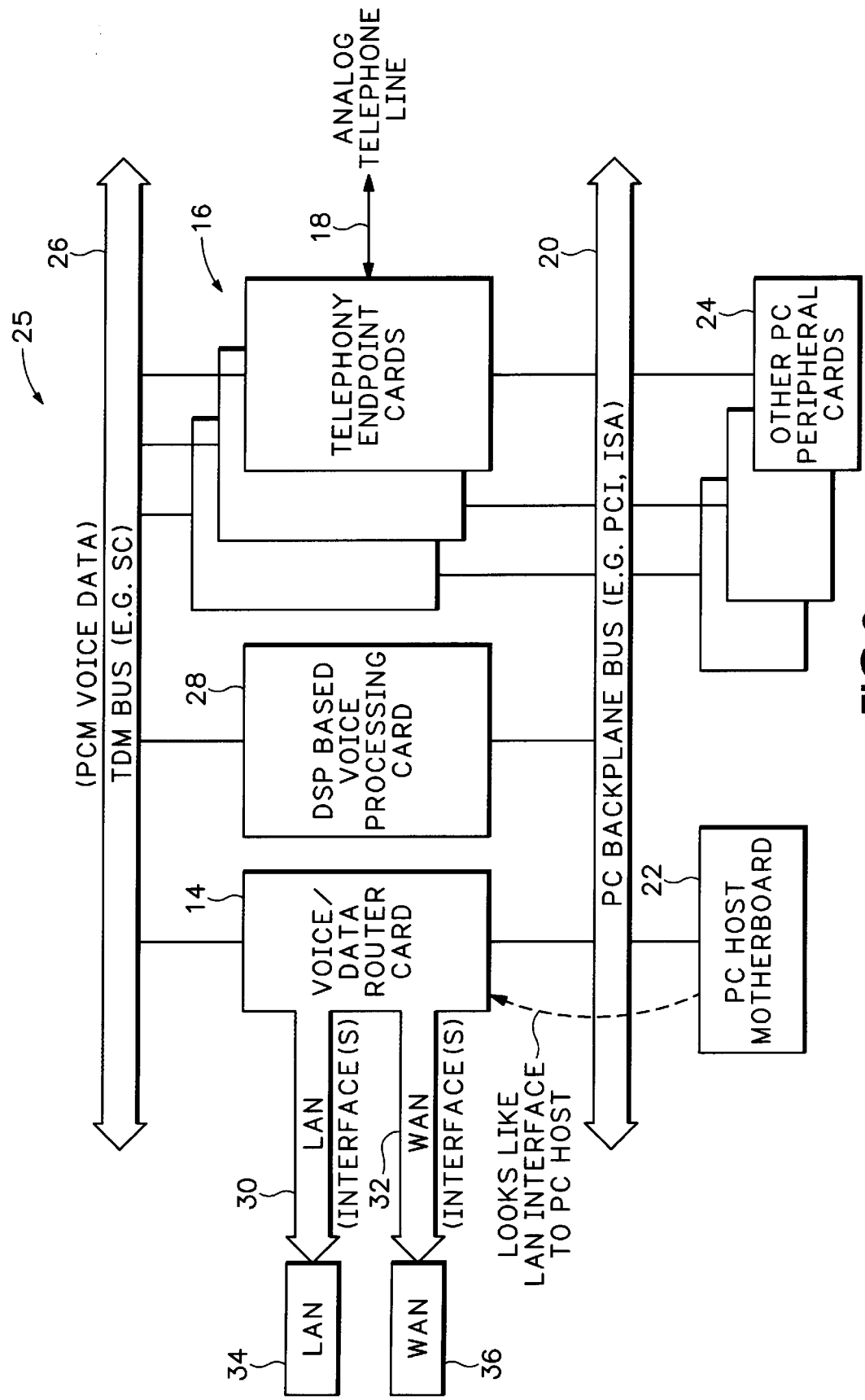
FIG. 2 is a circuit diagram of a PC-based server platform having a second bus for transferring telephony data according to the invention.

Referring to FIG. 2, the PC host motherboard 22 is coupled to various peripheral cards 24 through a PC backplane bus 20. Telephony endpoint cards 16, a voice data router card 14 and a DSP-based voice processing card 28 are coupled between the PC backplane bus 20 and a TDM bus 26. The PC Host Motherboard 22, PC Backplane Bus 20 and other PC Peripheral Cards 24 are conventional devices used on a PC server platform. The telephony endpoint cards 16 and TDM bus 26 are commercially available devices operable in a PC platform. For example, telephony endpoint cards and a TDM Signal Computing Bus (SC®Bus) are available from Dialogic Corporation, 1515 Route Ten, Parsippany, N.J. 07054.

The voice/data router card 14 is described in detail in U.S. Provisional Patent Application Ser. No. 60/023,551 filed Aug. 7, 1996 which was converted into pending U.S. patent application Ser. No. 08/709,178 filed Sep. 6, 1996 now U.S. Pat. No. 5,991,817, and is herein incorporated by reference. The router card 14 communicates with the telephony endpoint cards 16 over the TDM bus 26 for sourcing and sinking PCM telephony data. The router card 14 packetizes voice data from the TDM bus 26 for routing through one of the LAN 30 or WAN 32 interfaces and supports an Internetworking Operating System (IOS). The router card provides both LAN and WAN attachment capability for the PC host motherboard 22.

In one embodiment, the telephony endpoint cards 16 and router card 14 process data at a rate of 64,000 bits per second (kbps) per telephony channel. Thus, the TDM bus 26 can support a variety of LAN interfaces 30 and WAN interfaces 32, including Ethernet, FDDI, T1/E1, T3/E3, ISDN PRI, and ATM. For small configurations, the router card 14 contains all the necessary DSPs and ancillary voice compression and decompression circuitry.

The router card 14 may or may not include voice compression hardware, depending on the number of supported telephony ports. The DSP-based voice processing card 28 is optional and allows voice compression/decompression to be offloaded from the router card 14. A separate voice processing card 28 expands capacity beyond that provided by a DSP on the router card 14.

In another embodiment, voice packetization is shared among several voice processing cards. In this case, the TDM bus 26 is used to transport compressed speech between the router cards and the voice processing cards. This would use a specialized framing technique to allow the compressed speech to be sent over the TDM bus 26. Present router cards handle about 10,000 packets per second (pps) fast switched. Thus, about 100 two-way voice conversations can be processed by the system 25 shown in FIG. 2.

Figure 3:
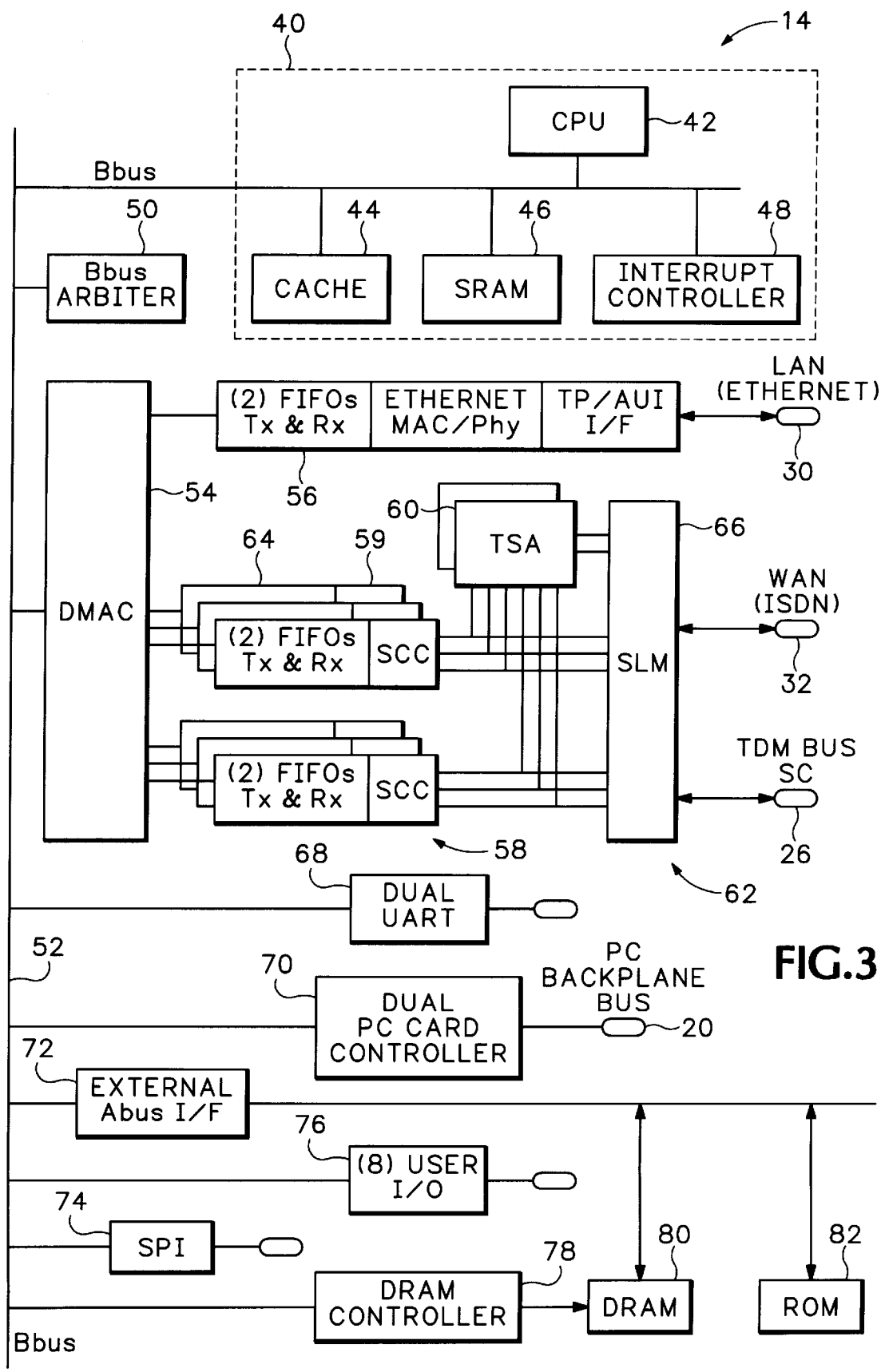
FIG. 3 is a detailed block diagram of a router shown in FIG. 2.

Referring to FIG. 3, the router 14 includes an internal Bbus 52 coupled to a CPU system 40. The CPU system 40 includes a central processing unit 42, cache memory 44, SRAM 46 and an interrupt controller 48. The Bbus 52 is coupled to a multi-channel circuit 62 which includes an Ethernet channel 56 and multiple serial channels 58. The serial channels 58 are configurable into one or more time division multiplexed channels for transmitting and receiving data packets, for example, on an ISDN line through the WAN interface 32. The serial channels are also configurable into one or more ports for interfacing with the TDM bus 26. A DMA controller 54 couples the Ethernet channels 56 and all the serial channels 58 to the Bbus 52.

The serial channels 58 include a serial line multiplexer (SLM) 66 coupled to the WAN and TDM bus. Multiple serial communication controllers (SCCs) 59 are each coupled between the direct memory access controller (DMAC) 54 and the SLM 66 and individually control data transfers for each one of the serial channels 58. Transmit and receive FIFOs 64 are located in each serial channel 58 and store transmit and receive data packets. A time slot assigner (TSA) circuit 60 is coupled between the SLM 62 and the SCCs 59 for processing TDM data.

Interface circuitry coupled to the internal bus and integrated onto the silicon chip include UARTs 68, PC card controllers 70 coupled to the PC backplane bus 20, an external Rbus interface circuit 72, a user definable input/output circuit 76 having programmable pulse width detection, a serial peripheral interface (SPI) 74 and a DRAM controller 78. External DRAM 80 and ROM 82 are coupled through the Rbus interface 72 to the Bbus 52 and controlled by the DRAM controller 78. A bus arbiter 50 grants control of the Bbus to the different router processing elements.

In another embodiment of the invention, one router 14 is integrated on each voice compression card. In this case, the DSP compression engines are coupled directly to the Bbus 52 and interact directly with the other router circuitry as voice packets are generated and received from the network interfaces 26, 30 and 32. If an intelligent microcontroller is required, that function is preformed by the router logic, for example, by CPU 40.

Figures 4, 5:
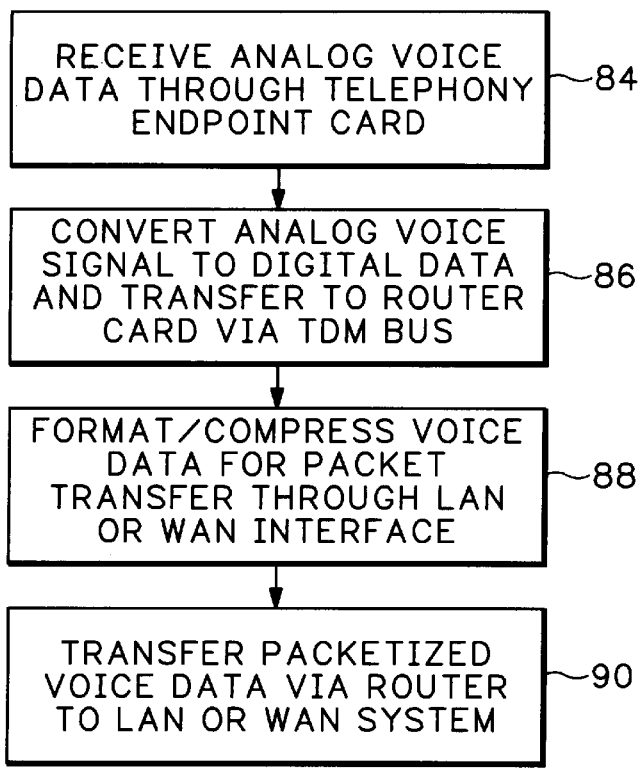
FIGS. 4 and 5 are step diagrams showing how the PC-based server platform shown in FIG. 2 processes telephony data.

Referring to FIG. 4, the PC server platform 25 shown in FIG. 2 transmits voice data in the following manner. Analog voice data is received via an analog telephone line 18 into the telephony endpoint cards 16 in step 84. The analog voice data is converted into a pulse code modulated (PCM) signal and transferred over the TDM bus 26 to the router card 14 in step 86. If a separate voice processing card 28 is coupled to the TDM bus 26, the voice data is transferred to the voice processing card 28 via TDM bus 26. The voice processing card 28 compresses the voice data and then transfers the compressed data to router card 14 via TDM bus 26. The voice data is then formatted into the network protocol for the target network system in step 88. For example, the voice data is formatted into an IP packet for routing over the WAN 36. The formatted data is then transferred out of the appropriate LAN or WAN network interface in step 90.

Referring to FIG. 5, data packets are received over either the LAN or WAN interface of router card 14 in step 92. The router decodes a packet header to determine the appropriate endpoint for the data packet in decision step 94. If the data packet is directed to the PC host motherboard 22, the data packet is routed to the PC host 22 through the PC backplane bus 20 in step 96. If the data packet contains telephony data directed to the telephony endpoint cards 16, the data packets are converted into a PCM data format and decompressed in step 98. The voice data is then routed to the telephony endpoint cards 16 via TDM bus 26 in step 100.

The TDM bus 26 transfers telephony data between different network systems and the telephony endpoint cards independently of the host system and the host system backplane bus. Since the PC host processor is not required to handle data intensive voice packet handling, many of the latencies occurring in current PC server-based telephony systems are eliminated or reduced.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A network server platform, comprising:

a host system including a first bus for transferring packets between the host system and peripheral devices;

a telephony endpoint for converting telephony signals into digital telephony data;

a network processing device including a first network interface coupled to a network for transferring the packets between devices on the network and the network server platform, a second interface coupled to the first bus for transferring the packets containing digital data received over the first interface to the host system, and a third TDM interface for transferring digital telephony data contained in packets received over the first interface to the telephony endpoint; and a second bus coupled between the third TDM interface of the network processing device and the telephony endpoint, the network processing device identifying the packets received over the first interface associated with the host system by decoding an address in a packet header and sending the digital data identified as associated with the host system through the second interface and then over the first bus, the network processing device identifying the digital telephony data contained in the packets received over the same first interface associated with the telephony endpoint by decoding the address in the packet header, reformatting the identified digital telephony data into TDM digital telephony data, and then transferring the TDM digital telephony data from the third TDM interface over the second bus to the telephony endpoint independently of the host system, the second interface, and the first bus.

2. A network server platform according to claim 1 including a voice processing card coupled in parallel with the network processing device between the first and second bus for compressing and decompressing the TDM digital telephony data transferred on the second bus.

3. A network server platform according to claim 1 wherein the first network interface of the network processing device comprises a LAN interface or a WAN interface, the network processing device transferring the packets through the LAN or WAN interface and the second interface to the host system through the first bus and sending the TDM digital telephony data received at the LAN or WAN interface through the third TDM interface to the telephony endpoint over the second bus.

4. A network server platform according to claim 1 wherein the host system comprises a PC motherboard having a host processor that configures both the network processing device and the telephony endpoint through the first bus.

5. A network server platform according to claim 4 wherein the first bus comprises a PC backplane bus.

6. A network server platform according to claim 1 wherein the second bus comprises a pulse code modulated time division multiplexed bus.

7. A network server platform according to claim 1 wherein the telephony endpoint converts the telephony signals received from the telephony endpoint into pulse code modulated signals and the network processing device formats the pulse code modulated signals into Voice Over IP data packets.

8. A network server platform according to claim 1 wherein the telephony endpoint and the network processing device are coupled in parallel between the first bus and the second bus.

9. A telephony-based network processing device for a PC server platform, comprising:

a first interface coupled to a packet switched network for transferring and receiving network data packets;

a second interface coupled to a PC host system through a PC backplane bus for transferring data packets between the packet-switched network coupled to the first interface and the PC host system coupled to the second interface;

a third TDM interface coupled to a telephony endpoint card through a TDM telephony data bus, the network processing device reformatting Voice Over IP packets received from the first interface into time division multiplexed telephony signals and transferring the time division multiplexed telephony signals between the third TDM interface and the telephony endpoint over the TDM telephony data bus independently of the PC backplane bus; and a processor coupled in parallel between the PC backplane bus and the TDM telephony data bus for compressing and decompressing the time division multiplexed telephony signals and converting the compressed telephony signals into network data packets independently of the PC host system.

10. A network processing device according to claim 9 wherein the first interface comprises a LAN or a WAN interface.

11. A network processing device according to claim 10 wherein the TDM telephony data bus transfers pulse code modulated audio signals.

12. A network processing device according to claim 11 wherein the PC backplane bus comprises a PCI or ISA bus.

13. A method for transferring telephony data between a host platform and an IP-based network, comprising:

processing data with a host processor and a telephony endpoint on the host platform;

identifying the data as associated with the host processor or the telephony endpoint by decoding an address in a packet header;

transferring data associated with the host processor between the IP-based network and the host processor over a first bus;

converting the data identified as associated with the telephony endpoint into digital audio signals;

transferring the digital audio signals between the IP-based network and the telephony endpoint using only a second bus that operates independently of the first bus and is reserved for only transferring audio signals wherein transferring data between the IP-based network and the telephony endpoint comprises the following:

converting analog telephony signals received at the telephony endpoint into time division multiplexed digital telephony signals;

transferring the digital telephony signals from the telephony endpoint to a network processing device in the host platform over the second bus;

formatting the digital telephony signals into Voice Over IP packets in the network processing device; and sending the Voice Over IP packets over the IP-based network with the network processing device.

14. A method according to claim 13 including the following steps:

compressing the telephony data routed from the telephony endpoint to the network system on the second bus; and decompressing the telephony data routed from the network system to the telephony endpoint on the second bus.

* * * * *